United States Patent [19]
Barton

[11] 3,916,767
[45] Nov. 4, 1975

[54] HYDRAULIC CONTROL CIRCUIT FOR VEHICLES

[75] Inventor: Robert M. Barton, Burlington, Iowa
[73] Assignee: J. I. Case Company, Racine, Wis.
[22] Filed: June 14, 1973
[21] Appl. No.: 369,800

[52] U.S. Cl. ..................... 91/412; 60/484; 60/486; 180/6.48; 214/762
[51] Int. Cl.² ......................................... F15B 13/09
[58] Field of Search ........... 214/762, 763; 180/6.48, 180/66 R; 60/484, 486; 91/412

[56] References Cited
UNITED STATES PATENTS

| | | | |
|---|---|---|---|
| 3,095,990 | 7/1963 | Granryd | 214/762 |
| 3,485,315 | 12/1969 | Bergren | 180/66 R |
| 3,542,228 | 11/1970 | Horsch | 214/762 |
| 3,583,512 | 6/1971 | Praddaude | 180/66 R |
| 3,599,814 | 8/1971 | Brownfield | 180/66 R |
| 3,646,596 | 2/1972 | Bauer | 60/486 |

Primary Examiner—Robert J. Spar
Assistant Examiner—Ross Weaver
Attorney, Agent, or Firm—Dressler, Goldsmith, Clement & Gordon, Ltd.

[57] ABSTRACT

A hydraulic control circuit for a front end loader is disclosed in this application. A device is used to interconnect a main and an auxiliary circuit so that additional fluid may be supplied to one of the circuits to operate a hydraulic device at a higher speed. In one embodiment, the main and auxiliary circuits are in parallel and the device is used to supply additional fluid from the auxiliary circuit to the main circuit. In a second embodiment, the main and auxiliary circuits are in series and the device is used to supply additional fluid to either the main or auxiliary circuit.

5 Claims, 3 Drawing Figures

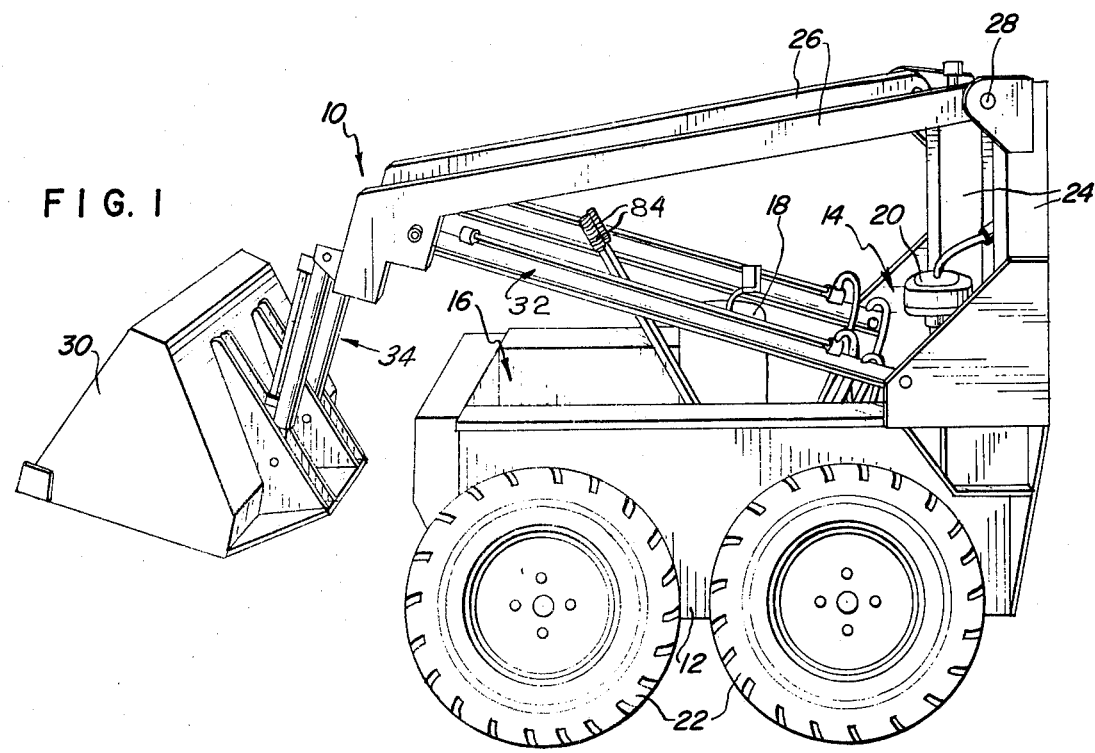

HYDRAULIC CONTROL CIRCUIT FOR VEHICLES

BACKGROUND OF THE INVENTION

The present invention relates generally to material handling vehicles and more particularly to a hydraulic circuit for such vehicles.

Recently, highly maneuverable front end loaders have been developed. Since the initial development of this type of material handling unit, various hydraulic systems have been developed for incorporation into such a unit. For example, White, Jr., U.S. Pat. No. 3,388,821, discloses hydraulic drive systems that include hydrostatic transmission means that connect the engine with the wheels of the vehicle for smooth efficient control of speed in any direction. More particularly, the hydraulic drive system that is disclosed in the White patent relates to a system in which the steering is accomplished by stopping, retarding movement or reversing movement of the ground engaging wheels on one side of the vehicle with respect to the wheels on the other side of the vehicle.

As is normal in units of this type having hydraulic drive systems, the valves forming part of the drive system are normally designed so that actuation of the valve from its neutral position supplies fluid to the hydraulic drive at a predetermined rate. Under certain conditions, additional fluid for propelling the vehicle may be desirable. While it may be suggested that this can be accomplished by increasing the capacity of the vehicle propelling pumps, the compact size of the vehicle and the increased cost makes such a solution undesirable.

Because of the competition between various manufacturers, manufacturers are constantly striving to build a better and more versatile unit for less money.

SUMMARY OF THE INVENTION

The present invention is incorporated into a vehicle having a body that defines an engine space at one end and a forward space for the operator's legs at the opposite end with a seat for the operator intermediate to the two ends. A pair of wheels are rotatably supported on each side of the body and the engine is located in the engine space. A stanchion projects upwardly from the body on each side of the engine space and a lifting arm is pivotally connected to the upper end of each stanchion. The lifting arms extend forwardly along the body and downwardly adjacent the forward end and a material handling device is pivotally supported on the forward ends of the lift arms. Hydraulic means is provided for raising and lowering the arms and for tilting the material handling device mounted thereon.

The invention is in a hydraulic control system that includes a main hydraulic control circuit for the propulsion of the vehicle. The main hydraulic control circuit includes a fluid reservoir and main pump means for supplying hydraulic fluid under pressure from the reservoir through conduit means to control valves. The hydraulic circuit also includes a pair of fixed displacement hydraulic motors, each drivingly connected to a pair of wheels. A device is used to selectively allow an auxiliary pump means to supply additional fluid under pressure from the reservoir to the control valves to operate hydraulic devices such as the hydraulic motors at a higher speed.

In one embodiment the main pump means in the main hydraulic circuit supplies fluid to the hydraulic motors and the auxiliary pump means supplies fluid to an auxiliary circuit which includes a material handling means. The device may be selectively used to direct the additional fluid from the auxiliary pump means to the hydraulic motors to operate the vehicle at a higher speed.

In a second embodiment, the main pump means in the main hydraulic circuit supplies fluid to either the hydraulic motors or the material handling means when the vehicle is in a neutral position. The device may be selectively used to direct the additional fluid from the auxiliary pump means to operate the vehicle at a higher speed or to operate the material handling means at a higher speed when the vehicle is in a neutral position. In this embodiment, all of the fluid supplied to the main hydraulic circuit is also available to operate the material handling means.

BRIEF DESCRIPTION OF SEVERAL VIEWS OF DRAWINGS

FIG. 1 of the drawings shows a perspective view of the material handling vehicle incorporating the hydraulic control system of the present invention;

FIG. 2 is a schematic illustration of aa hydraulic circuit which incorporates the invention;

DETAILED DESCRIPTION

Figure 3:
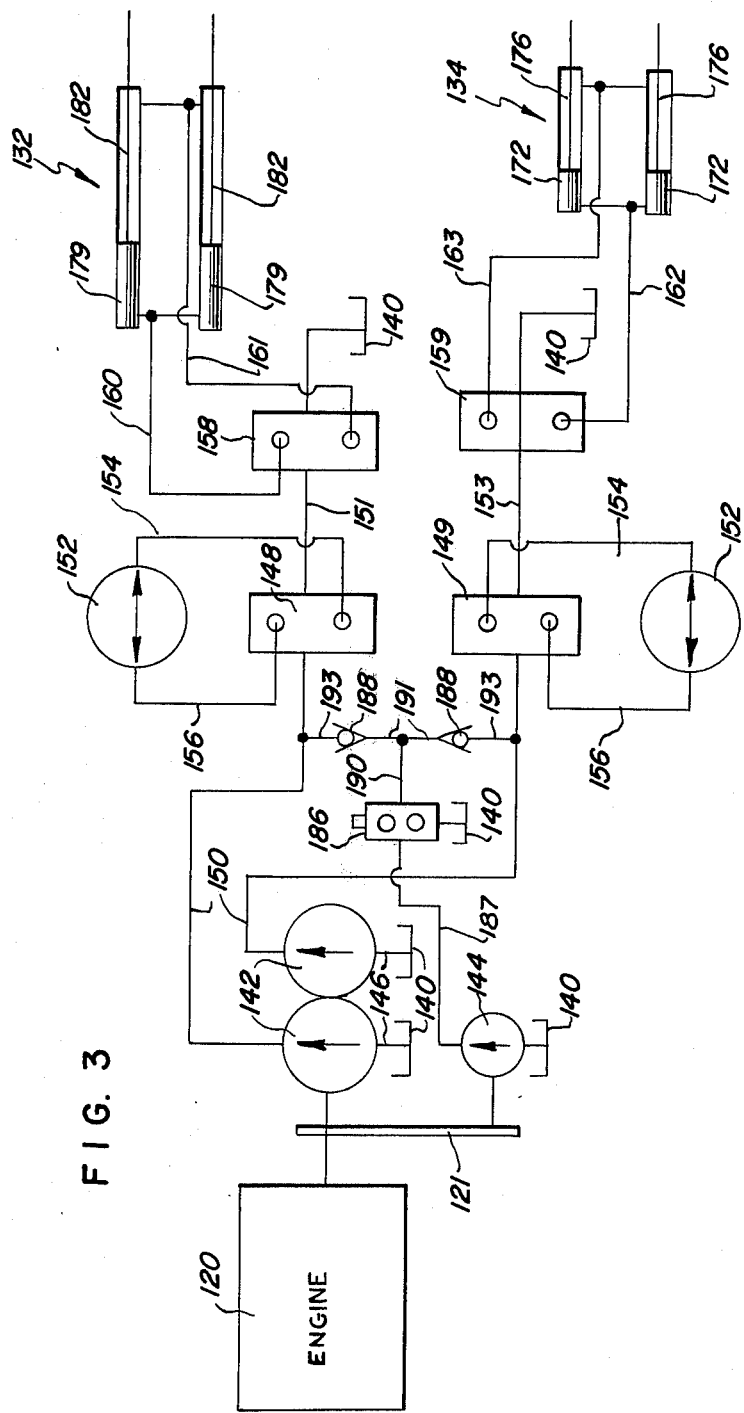
FIG. 3 is a schematic illustration of a modified hydraulic circuit which incorporates the invention.

While this invention is susceptible of embodiment in many different forms there is shown in the drawings and will herein be described in detail two specific embodiments, with the understanding that the present disclosure is to be considered as an exemplification of the principles of the invention and is not intended to limit the invention to the embodiments illustrated.

FIG. 1 of the drawings shows an overall construction of an exemplary vehicle that may have the present invention incorporated therein. Vehicle 10 has an elongated generally U-shaped body 12 that has an engine space 14 adjacent to the rear end thereof and a forward space 16 at the opposite end with seat 18 located intermediate the ends. Engine 20 is located in engine space 14 while forward space 16 is designed for the operator's legs. The vehicle further includes first and second pairs of wheels 22 (only one pair being shown) respectively located on opposite sides of the body 12 and stanchions 24 projecting upwardly from the body on each side of the engine space. A lift arm 26 is pivotally connected at 28 on the upper end of each stanchion.

The lift arms project forwardly along the body and downwardly adjacent the forward end of the body and material handling means or bucket 30 is pivotally connected to the lower forward ends of the respective lift arms. Hydraulic fluid rams 32 are positioned between each stanchion 24 and its associated lift arms 26 so that the lift arms may be raised and lowered on the vehicle. Also, hydraulic fluid rams 34 are located between the material handling means and the lift arms to pivot the material handling means relative to the lift arms. It should be noted that while the material handling means has been shown as a bucket, this device could readily be a dozer blade, scoop, lift fork, etc.

A hydraulic control circuit which incorporates the features of the invention is schematically illustrated in FIG. 2 and includes reservoir 40 and pump means in the form of a dual gear pump 42 and an auxiliary pump 44. The dual gear pump 42 is connected to reservoir 40 through conduit means 46. The dual gear pump 42 and auxiliary pump 44 are drivingly connected to engine 20 by drive belt 21. Each pump of the dual gear pump 42 is part of a hydraulic control circuit driving a pair of wheels and the hydraulic control circuits cooperate to define a main hydraulic control circuit for propelling the vehicle.

Each main hydraulic control circuit or propulsion circuit includes valve means such as control valve 48 connected to one of the dual gear pumps 42 through conduit means 50. Control valve 48 is also connected to hydraulic motor means 52 through first and second conduits 54 and 56. Any suitable fixed placement hydraulic motor 52 may be utilized.

Control valve 48 is a three-positioned valve which has a neutral position and a first and second operative position on opposite sides of the neutral position. In one of the operative positions, fluid under pressure is supplied from conduit means 50 through first conduit 54 to operate the motor in one direction and the fluid is returned to reservoir 40 by means of second conduit 56. In the other operative position, fluid under pressure is delivered to the second conduit 56 to operate the motor in the opposite direction and is returned to reservoir 40 by means of first conduit 54.

The auxiliary pump 44 is used to operate the material handling device through an auxiliary hydraulic circuit. The auxiliary circuit includes valve means such as dual loader valve 58 connected to auxiliary pump 44 through conduit 60. Dual loader valve 58 consists of a pair of three-positioned valves 57 and 59, valve 57 operating tilt fluid rams 34 and valve 59 operating lift fluid rams 32. When both three-positioned valves are in the neutral position, fluid is directed through dual loader valve 58 and returned to reservoir 40 through conduits 66 and 68 and valve 86, that will be described later. In one operative position for valve 57, fluid under pressure is delivered to conduit 70 connected to one end of cylinders 72 forming part of tilt fluid rams 34, while the opposite end of the cylinders are in communication with reservoir 40 through conduit 74. In this position, piston rods 76, forming part of tilt fluid rams 34, will be extending to pivot the bucket 30 to a dump position. When valve 57 is moved to a second operative position, the connections to conduits 70 and 74 are reversed and the piston rods are retracted.

Valve 59 and lift fluid rams 32 operate in a similar manner. In one operative position for valve 59, fluid under pressure is delivered to conduit 78 connected to one end of lift cylinders 79 forming part of lift fluid rams 32, while the opposite end of the lift cylinders are in communication with reservoir 40 through conduit 80. In this position, piston rods 82, forming part of lift fluid rams 32, will be extended to raise the lift arm. When valve 59 is moved to a second operative position, the connections to conduits 78 and 80 are reversed and the piston rods are retracted.

Control valves 48 are preferable actuated by hand levers 84 (FIG. 1) while dual loader valve 58 is actuated by foot pedals (not shown) in the forward space. It will be noted that in the hydraulic circuit as described above, actuation of either or both motor control valves 48 does not prevent actuation of lift fluid rams 32 or tilt fluid rams 34 since double pump 42 operates independently of auxiliary pump 44.

The hydraulic circuit incorporates valve means cooperating with the main hydraulic circuit and the auxiliary hydraulic circuit to allow fluid from the auxiliary pump to be diverted to the main hydraulic circuit to provide additional flow for transporting the vehicle at high speeds and with minimum tractive effort. When the valve means is inoperative, all the fluid from the auxiliary pump will be available to operate the tilt and lift fluid rams.

The valve means for accomplishing these various alternatives is high-low selector valve 86. High-low selector valve 86 is connected to dual loader valve 58 by conduit 66. High-low selector valve 86 is also connected through conduit 90 to pressure responsive valve means in the main circuit, such as check valves 88. Check valves 88 communicate with conduits 50 through conduits 92 and provide unidirectional flow from selector valve 86 to conduits 50 but prevent flow from conduits 50 to selector valve 86. Thus, when valves 57 and 59, forming dual loader valve 58, are in a neutral position and the high-low selector valve 86 is in an operative position, flow into dual loader valve or auxiliary valve means 58 is directed to the main hydraulic control circuits providing additional flow for transporting the vehicle at a higher speed. It will be appreciated that in order to accomplish this, the pressure of the fluid in the conduit 90 produced by auxiliary pump 44 must be greater than the pressure of the fluid in conduits 50 produced by double pump 42 in order to permit check valves to open, allowing flow into the main hydraulic control circuits or propulsion circuits.

In this mode lift fluid rams 32 and tilt fluid rams 34 may be operable at the expense of the additional vehicle speed by diverting some of the flow that passes through the dual loader valve 58 into the tilt fluid rams or lift fluid rams circuit.

When the high-low selector valve 86 is in the second operating position, flow through conduit 66 is diverted into reservoir 40 and only the flow from double pumps 42 is provided to the propulsion circuits and all of the fluid from the auxiliary pump 44 is available for the operation of the lift and tilt fluid rams. The high-low selector valve 58 may be of any type but is preferably a two-position valve that is manually moved between positions and is indexed in either position.

SECOND EMBODIMENT

A second embodiment of the invention is schematically illustrated in FIG. 3. In this embodiment, dual pump 142 supplies fluid to the hydraulic motors for the operation of the vehicle and to the material handling means. Valve means equivalent to high-low selector valve 86 when operative, will supply the additional flow from auxiliary pump 144 to either the hydraulic motors to operate the vehicle at a higher speed or to the material handling means to operate it at a higher speed.

The hydraulic control system shown in FIG. 3 includes reservoir 140 and pump means in the form of a dual gear pump 142 and an auxiliary pump 144. The dual gear pump 142 is connected to reservoir 140 through conduit means 146. The dual gear pump 142 and auxiliary pump 144 are drivingly connected to engine 120 by belt drive 121. Each pump of the dual gear pump 142 is part of a hydraulic control circuit for dirving a pair of wheels and the hydraulic control circuits cooperate to define a main hydraulic circuit for propulsion of the vehicle. When the vehicle is not in motion, all of the fluid from each pump of the dual gear pump 142 is directly available to operate the material handling means.

Hydraulic control circuits include a valve means such as control valves 148 and 149, respectively, connected to the dual gear pumps 142 through conduit means 150. Control valves 148 and 149 are each connected to a hydraulic motor 152 through first and second conduits 154 and 156. Any suitable fixed displacement hydraulic motor 152 may be utilized.

Control valves 148 and 149 are three-position valves which have a neutral position and first and second operative positions on opposite sides of the neutral position. The operation of these valves and their cooperation with the hydraulic motor means has been previously described in connection with the first embodiment.

In the circuit shown in FIG. 3, the auxiliary circuit is located in series with the main hydraulic circuit. Thus, valve means, such as loader valves 158 and 159, are connected to control valves 148 and 149 by conduits 151 and 153 and receive all of the fluid that is supplied to control valves 148 and 149.

When control valve 148 is in a neutral position and loader valve 158 is in an operative position, all the fluid from one dual gear pump means is delivered through conduit 160 connected to one end of cylinders 179 forming part of lift fluid rams 132, while the opposite end of the cylinders are in communication with reservoir 140 through conduit 161. In this position, piston rods 182, forming part of lift fluid rams 132, will be extended to raise the lift arm. When valve 158 is moved to a second operative position, the connection to conduits 160 and 161 is reversed and the piston rods are retracted.

Loader valve 159 operates in a similar manner. When control valve 149 is in a neutral position and loader valve 159 is in an operative position, fluid under pressure is delivered through conduit 162 connected to one end of cylinders 172 forming part of tilt fluid rams 134, while the opposite end of the cylinders are in communication with reservoir 140 through conduit 163. In this position, piston rods 186, forming part of tilt fluid rams 134, will be extending to pivot bucket 30 to a dump position. When loader valve 159 is moved to a second operative position, the connections to conduits 162 and 163 are reversed and the piston rods are retracted.

In the embodiment shown in FIG. 3, the hydraulic circuit incorporates valve means cooperating with the main hydraulic circuit to allow additional fluid available from the auxiliary pump 144 to be supplied to either the main hydraulic circuit and the auxiliary circuit. Valve means, when operative, will have the flow from auxiliary pump 144 directed to either control valves 148 and 149 to provide additional flow for transporting the vehicle at a higher speed or directly through control valves 148 and 149 to loader valves 158 and 159 to operate the lift and tilt fluid rams at a higher speed. When the valve means is inoperative, all the fluid from the auxiliary pump will be directed back into reservoir 140.

The valve means for accomplishing these various alternatives is high-low selector valve 186 similar to valve 86. High-low selector valve 186 is connected to auxiliary pump 144 through conduit 187. High-low selector valve 186 is also connected to pressure responsive valve means in the main circuit, such as check valves 188 through conduits 190 and 191. Check valves 188 communicate with conduits 150 through conduits 193 and provide unidirectional flow from selector valve 186 to conduits 150. Thus, for example, when high-low selector valve 186 is in the operative position, flow from auxiliary pump 144 is directed through check valves or pressure responsive valve means 188 and into control valves 148 and 149 to operate the vehicle at a higher speed. When control valve 148 is in a neutral position, the additional flow from auxiliary pump 144 may be used to operate the lift fluid rams 132 at a higher speed. Similarly, when control valve 149 is in a neutral position, the additional flow from auxiliary pump 144 may be used to operate the tilt fluid rams 134 at a higher speed.

In the embodiment illustrated in FIG. 3, the material handling means may be operated while the vehicle is being transported. It will be noted that all of the fluid from the dual gear pumps 142 is delivered to loader valves 158 and 159. As explained above, when control valves 148 and 149 are in a neutral position, all of the fluid is delivered directly to loader valves 158 and 159. When the control valves are in either extreme position, all of the fluid is directed to the motors 152 and the return fluid from the motors is delivered to loader valves 158 and 159. This fluid may be used to operate fluid rams 132 and 134.

When control valves 148 and 149 are in intermediate positions between extreme positions, the valves will act as metering valves to supply part of the fluid from dual gear pump 142 to the respective motors 152 while the remainder of the fluid is supplied directly to loader valves 158 and 159. Of course, when the control valves are in the intermediate positions, the return fluid from motors 152 is also available to operate fluid rams 132 and 139.

It will be appreciated that the operation of the loader valves while the control valves are in an operative position will somewhat reduce the speed of the vehicle because the pressure drop across motors 152 will be reduced.

I claim:

1. In a vehicle having a main hydraulic circuit including first and second hydraulic motor means, main pump means including first and second pumps, first conduit means connecting said first pump to said first motor means for supplying fluid under pressure to said first motor means, second conduit means connecting said second pump to said second motor means for supplying fluid under pressure to said second motor means, first and second control valves respectively located in said first and second conduit means for controlling flow between said pumps and said motor means, auxiliary pump means connected to auxiliary valve means for supplying fluid to operate a material handling means, selector valve means connected to said auxiliary valve means, first and second conduits respectively connecting said selector valve means to said first and second conduit means between said main pump means and the respective motor means, each of said first and second conduits having a check valve therein preventing flow from said first and second conduit means to said selector valve means to said conduit means so that additional fluid is supplied from said auxiliary pump means directly to said motor means when said selector valve means is in an operative position and the pressure of fluid from said selector valve means is greater than the pressure of the fluid in said first and second conduit means.

2. In a vehicle having a hydraulic circuit including first and second hydraulic motor means, first and second main pumps, first and second conduit means respectively connecting said first and second main pumps to said first and second hydraulic motor means, separate control valve means in each of said conduit means, auxiliary pump means, selector valve means connected to said auxiliary pump means, first and second branch conduits connecting said selector valve means respectively to said first and second conduit means between said main pumps and said control valve means, each of said branch conduits having a pressure responsive valve therein limiting flow in one direction from said selector valve means to said conduit means, and auxiliary valve means connected to said control valve means for supplying fluid to operate a material handling means, said selector valve means having an operative position for supplying fluid under pressure from said auxiliary pump means through said pressure responsive valves directly to said control valve means.

3. A vehicle having a main hydraulic circuit including first and second hydraulic motor means, first and second pumps for supplying fluid under pressure to said first and second motor means, first and second conduit means respectively connecting said first and second pumps to said first and second motor means, each of said conduit means having a control valve therein for individually controlling the flow of fluid under pressure from the respective pumps to the respective motor means, auxiliary pump means, selector valve means connected to said auxiliary pump means, first and second branch conduits connecting said selector valve means to said first and second conduit means, said branch conduits being respectively connected to said conduit means between said pumps and said control valves, each of said first and second conduits having a pressure responsive check valve therein limiting flow from said selector valve means to said first and second conduit means so that additional pressurized fluid is supplied directly to said first and second hydraulic motor (conduit) means from said auxiliary pump means when said selector valve means is in an operative position and the pressure of the fluid in said selector valve means is greater than the pressure of the fluid in the first and second conduit means.

4. A vehicle as defined in claim 3, further including auxiliary valve means between said auxiliary pump means and said selector valve means for selectively supplying fluid from said auxiliary valve means to fluid operated material handling means.

5. A vehicle as defined in claim 3, in which each of said control valves has a neutral position and first and second operative positions, further including first and second auxiliary valves respectively connected to said control valves for supplying fluid to fluid operated material handling means when the control valves are in a neutral position.

* * * * *

UNITED STATES PATENT OFFICE
CERTIFICATE OF CORRECTION

PATENT NO. : 3,916,767
DATED : November 4, 1975
INVENTOR(S) : Robert M. Barton

It is certified that error appears in the above-identified patent and that said Letters Patent are hereby corrected as shown below:

Column 2, line 24, "aa" should read --a--.

Column 3, line 60, "preferable" should read --preferably--.

Column 4, line 64, "dirving" should read --driving.

Column 6, line 63, delete "to said conduit means" and substitute --, said check valves automatically connecting said selector valve means to said conduit means. --

Column 8, line 13, delete "(conduit)".

*Signed and Sealed this* seventeenth *Day of* February 1976

[SEAL]

Attest:

RUTH C. MASON
*Attesting Officer*

C. MARSHALL DANN
*Commissioner of Patents and Trademarks*